(12) United States Patent
Lin et al.

(10) Patent No.: US 9,971,130 B1
(45) Date of Patent: May 15, 2018

(54) COMPOSITE ARRAY CAMERA LENS MODULE

(71) Applicant: Industrial Technology Research Institute, Hsinchu (TW)

(72) Inventors: Chun-Ting Lin, Hsinchu (TW);
Chiun-Lern Fu, Hsinchu (TW);
Te-Kuei Chan, Hsinchu (TW);
Jenn-Nan Ku, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days. days.

(21) Appl. No.: 15/386,194

(22) Filed: Dec. 21, 2016

(30) Foreign Application Priority Data

Dec. 13, 2016 (TW) .............................. 105141206 A

(51) Int. Cl.
*G02B 9/00* (2006.01)
*G02B 9/08* (2006.01)
(Continued)

(52) U.S. Cl.
CPC ....... *G02B 13/0085* (2013.01); *G02B 3/0056* (2013.01); *G02B 3/0062* (2013.01); *G02B 5/005* (2013.01); *G02B 5/208* (2013.01)

(58) Field of Classification Search
CPC ............ H04N 13/0242; H04N 5/2254; H04N 5/2258; G02B 13/0085; G02B 3/0062; G02B 5/188; G06T 2207/30148
See application file for complete search history.

(56) References Cited

U.S. PATENT DOCUMENTS 6,429,036 B1  8/2002  Nixon et al.
6,483,101 B1  11/2002 Webster
(Continued)

FOREIGN PATENT DOCUMENTS

CN    104103657    10/2014
TW    I320871 B    2/2010

OTHER PUBLICATIONS

Bruückner, Jacques D. et al., "Thin wafer-level camera lenses inspired by insect compound eyes." Optics Express, (2011), pp. 24379-24394.
(Continued)

*Primary Examiner* — Alicia M Harrington
(74) *Attorney, Agent, or Firm* — Mintz Levin Cohn Ferris Glovsky and Popeo, P.C.; Peter F. Corless; Steven M. Jensen

(57) ABSTRACT

Disclosed is a composite array camera lens module, including: a first lens layer disposed at a position from a diaphragm toward an object space having a first-type lens and a second-type lens; a second lens layer disposed at a position from the diaphragm toward an image space having a third-type lens and a fourth-type lens, wherein the first-type lens and the third-type lens are positive lenses and form a first camera lens with a first effective focal length, and the second-type lens and the fourth-type lens are a negative lens and a positive lens, respectively, and form a second camera lens with a second effective focal length less than the first effective focal length; and an image sensor arranged at a side of the second lens layer away from the diaphragm, wherein the first lens layer, the second lens layer and the image sensor are designed to be parallel flat planes.

10 Claims, 6 Drawing Sheets

(51) Int. Cl.
*G02B 13/00* (2006.01)
*G02B 3/00* (2006.01)
*G02B 5/20* (2006.01)
*G02B 5/00* (2006.01)

(56) References Cited

U.S. PATENT DOCUMENTS

| | | |
|---|---|---|
| 6,734,419 B1 | 5/2004 | Glenn et al. |
| 7,569,409 B2 | 8/2009 | Lin et al. |
| 8,077,394 B2 | 12/2011 | Wu et al. |
| 9,241,111 B1 | 1/2016 | Baldwin |
| 2004/0240052 A1 | 12/2004 | Minefuji et al. |
| 2008/0290435 A1 | 11/2008 | Oliver et al. |
| 2010/0044815 A1 | 2/2010 | Chang |
| 2011/0080487 A1 | 4/2011 | Venkataraman et al. |
| 2013/0038775 A1 | 2/2013 | Nihei |
| 2013/0094102 A1* | 4/2013 | Baba .......... G02B 13/003 359/784 |

OTHER PUBLICATIONS

Meyer, Julia, et al., "Optical Cluster Eye fabricated on wafer-level." Optics Express, (2011), pp. 17506-17519.

Dunkel, J., et al., "Fabrication of microoptical freedon arrays on wafer level for imaging application." Optics Express, (2015), pp. 31915-31925.

Venkataraman, Kartic, et al., "An ultra-thin high performance monolithic cammera array." ACM Transactions on Graphics, (2013), Article No. 166.

Li, Min, et al., "A self-adaptive algorithm for small targets detection in clutter scene inspired by isects compound eye." Proceedings of the 8th World Congress on Intelligent Control and Automation, (2010), pp. 5268-5273.

Zhang, Zhongjian, et al., "A synchronous imaging system for moving-target detection with bionic compound eyes." International Congress on Image and Signal Processing (CISP), (2011), pp. 1809-1812.

* cited by examiner

COMPOSITE ARRAY CAMERA LENS MODULE

CROSS-REFERENCE TO RELATED APPLICATIONS

This application claims the priority benefit of Taiwan application serial no. 105141206, filed on Dec. 13, 2016. The entirety of the above-mentioned patent application is hereby incorporated by reference herein and made a part of this specification.

BACKGROUND

1. Technical Field

The disclosure relates to a camera lens technique, and, more particularly, to a wafer-level composite array camera lens module.

2. Description of Related Art

A vehicle safety system is used to determine the distance and the speed of an object in front of a vehicle for driving safety. Detection ranges vary with different vehicle speeds. If a single lens is used, the lens has to be adjusted by moving the stage to achieve wide-angle/telephoto effect, but the switching speed might not be fast enough for the speed at which the vehicle is going, so camera lenses with different focal lengths are proposed to detect the front object. Traditionally, the design of a wide-angle lens and a telephoto lens having different focal lengths is adopted; alternatively, a design of three lenses having three different focal lengths is adopted by adding another standard lens, so that images can be captured to infer the distance and the speed of an object in front when the vehicle is moving.

For such a vehicle safety system, since the relative positions and rotation angles of the plurality of sets of lenses have to be calibrated first, the assembly cost is high. Furthermore, image information obtained through only two or three lenses is limited, and errors may occur when the two or three lenses are used to determine the distance and the speed of the object in front of the vehicle. However, if more lenses are used, alignment and calibration are needed when the various lenses are assembled together. If this is not done properly, it will lead to the misjudgment in the object's depth information. In addition, in the case of using only two or three lenses, if a single lens fails, the images cannot be compared with one another, and it may result in detection errors.

Therefore, a camera lens assembly capable of capturing images near and far as well as fast image switching and comparison at different vehicle speeds is thus required to achieve full speed range object detection.

SUMMARY

The disclosure provides a composite array camera lens module, which may comprise: a first lens layer, a second lens layer and an image sensor. The first lens layer is disposed at a position from a diaphragm towards an object space and may comprise a first-type lens and a second-type lens. The second lens layer is disposed at a position from the diaphragm towards an image space and may comprise a third-type lens and a fourth-type lens. The first-type lens and the third-type lens are positive lenses and form a first camera lens with a first effective focal length. The second-type lens and the fourth-type lens are a negative lens and a positive lens, respectively, and form a second camera lens with a second effective focal length less than the first effective focal length. The image sensor is arranged at a side of the second lens layer away from the diaphragm. The first lens layer, the second lens layer and the image sensor are designed to be flat planes, and an interval between any two of the planes is constant. A reciprocal of an effective focal length of any of the lenses in the first and second lens layers is not zero.

DETAILED DESCRIPTION

The disclosure is described by the following specific embodiments. Those with ordinary skills in the arts can readily understand other advantages and functions of the disclosure after reading the disclosure of this specification. However, the disclosure may also be practiced or applied with other different implementations.

In a wafer-level lens manufacturing process, array lenses in the same layer have approximately the same thickness, and are disposed very close to array lenses in the next layer. Therefore, it is complicated to design lenses with different effective focal lengths and fields of view. The disclosure provides a composite array camera lens module on an image sensor having an identical height using a wafer-level lens manufacturing process, in which the lenses require assembly and alignment only once. As a result, the composite array camera lens module according to the disclosure has advantages of easy assembly, high accuracy and low cost.

Figure 1:
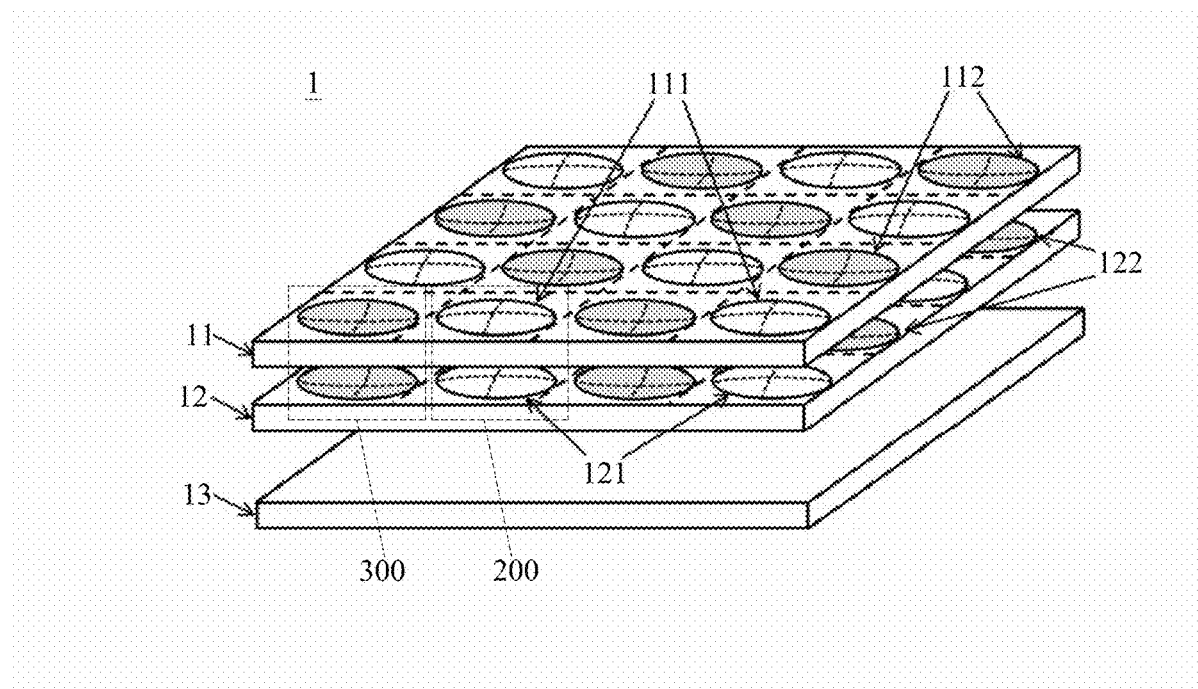
FIG. 1 is a schematic diagram illustrating the structure of a composite array camera lens module in accordance with the disclosure.

Referring to FIG. 1, a schematic diagram illustrating the structure of a composite array camera lens module 1 in accordance with the disclosure is shown. The composite array camera lens module 1 comprises two lens layers, i.e., upper and lower lens layers, each of which comprises a plurality of lenses that form a lens array. The lenses in the same layer are formed first, and then the lenses in upper and lower lens layers are aligned and assembled. The lenses thus manufactured are not only easy to assemble, and have reduced cost since some complicated production steps are omitted. The composite array camera lens module 1 according to the disclosure comprises a first lens layer 11, a second lens layer 12 and an image sensor 13.

The first lens layer 11 is disposed at a position from a diaphragm (not shown) towards an object space. The first lens layer 11 comprises first-type lenses 111 and second-type lenses 112. The diaphragm is disposed at a side of the first lens layer 11 facing the second lens layer 12 and used to determine the size of a beam passing through the overall optical system, that is, to limit the imaging range or control imaging brightness. The diaphragm can be formed on the surface of the first lens layer 11 facing the second lens layer 12 by spraying. In an embodiment, an area of the first lens layer 11 facing the second lens layer 12 where there is no first-type lenses 111 and second-type lenses 112 are sprayed black, leaving only the first-type lenses 111 and the second-type lenses 112 to allow light to pass through while the remaining flat areas are opaque.

Moreover, the diaphragm may be designed as a separate layer for controlling the amount of incident light. With software computation, the diaphragm can also limit an imaging range or control imaging brightness.

The second lens layer 12 is disposed at a position from the diaphragm towards an image space. The second lens layer 12 comprises third-type lenses 121 and fourth-type lenses 122. The first-type lenses 111 and the third-type lenses 121 are positive lenses, and form a first camera lens 200 with a first effective focal length. The second-type lenses 112 and the fourth-type lenses 122 are negative lenses and positive lenses, respectively, and form a second camera lens 300 with a second effective focal length less than the first effective focal length.

The first-type lenses 111 and the second-type lenses 112 in the first lens layer 11 form an array combination. The third-type lenses 121 and fourth-type lenses 122 in the second lens layer 12 also form an array combination. Therefore, by purposefully designing the relative positions and array arrangement between the first-type lenses 111 and second-type lenses 112 in the first lens layer 11, and the relative positions and array arrangement between the third-type lenses 121 and the fourth-type lenses 122, it would be relatively easy to vertically align the lens array in the first lens layer 11 with the lens array in the second lens layer 12. The various types of lenses in the first lens layer 11 and the second lens layer 12 are formed on respective single substrates, so as long as the first lens layer 11 and the second lens layer 12 are aligned, then the first-type lenses 111 and the second-type lenses 112 can be also aligned with the third-type lenses 121 and the fourth-type lenses 122, respectively. Therefore, the alignment process is simple with high accuracy.

The first-type lenses 111 and the second-type lenses 112 in the first lens layer 11 have different focal lengths. The third-type lenses 121 and the fourth-type lenses 122 in the second lens layer 12 also have different focal lengths. With the combination of the first lens layer 11 and the second lens layer 12, camera lenses with different effective focal lengths are formed, e.g., the first camera lens 200 and the second camera lens 300 as described previously. For example, if both of the two layers are a combination of positive lenses, a telephoto lens is formed. On the other hand, if both of the two layers are a combination of negative and positive lenses, a wide-angle lens is formed. This aspect is further described in embodiments below.

The image sensor 13 is disposed at a side of the second lens layer 12 away from the diaphragm. The first lens layer 11, the second lens layer 12, and the image sensor 13 are designed to be flat plane, and an interval between any two of the planes are constant. A reciprocal of the effective focal length of any lens in the first lens layer 11 and the second lens layer 12 is not equal to zero.

Since the first lens layer 11 comprises lenses with different focal lengths, and the second lens layer 12 also comprises lenses with different focal lengths, after the first lens layer 11 and the second lens layer 12 are assembled, a lens assembly with telephoto or wide-angle lens effect can be formed. In addition, the first lens layer 11 (the areas without the lenses), the second lens layer 12 (the areas without the lenses) and the image sensor 13 are designed to be flat planes, so there will be no height difference within the same lens layer or the image sensor. In other words, the interval between any two of opposing surfaces of the first lens layer 11 (the areas without the lenses) where the first-type lenses 111 and the second-type lenses 112 are disposed, opposing surfaces of the second lens layer 12 (the areas without the lenses) where the third-type lenses 121 and the fourth-type lenses 122 are disposed, and a sensing surface of the image sensor 13 is constant.

In order to reduce the size of the camera lenses, the disclosure fully utilizes the first lens layer 11 and the second lens layer 12, and leaves no space without any lenses, thereby creating differences in distances and thus different focal lengths. Therefore, the reciprocal of the effective focal length of any of the lenses in the first lens layer 11 and the second lens layer 12 is not equal to zero, i.e., the effective focal length is not infinity.

The disclosure provides a composite array camera lens (with the first camera lens 200 and the second camera lens 300) on the image sensor 13 having an identical height using a wafer-level lens manufacturing process. Lenses in the same layer are formed first, and have two or more different radii of curvatures. Different layers of lens array and the image sensor are then aligned and assembled to form the composite array camera lens with two or more focal lengths and two or more fields of view. Therefore, array camera images with different focal lengths can be obtained on the image sensor 13.

Compared to the prior art in which a plurality of lenses required to detect the distance of a front object are assembled difficulty and more cost, the disclosure only requires alignment and assembly once and eliminates the need for calibration of relative positions and rotating angles of different lenses. Therefore, the disclosure has simpler assembly procedures, higher accuracy and lower assembly cost.

In another embodiment, the composite array camera lens module 1 according to the disclosure further comprises an infrared filter, which can be provided between the second lens layer 12 and the image sensor 13. As shown by the reference numeral 34 in FIG. 3, the infrared filter can filter out infrared light. Although infrared cannot be seen by naked eyes, it can be detected by the image sensor 13. In the case that the infrared light is much stronger than the visible light, the image sensor 13 may not be able to distinguish them, resulting in errors. Thus, the provision of the infrared filter filters out the infrared light but allows the visible light to go pass.

In addition to providing the infrared filter separately, an infrared filtering material can be coated on the surface of the lens layer in front of the image sensor 13, for example, coated on a surface of the second lens layer 12 closer to the image sensor 13, to form an infrared filtering layer. This equally achieves infrared filtering.

Figure 2A:
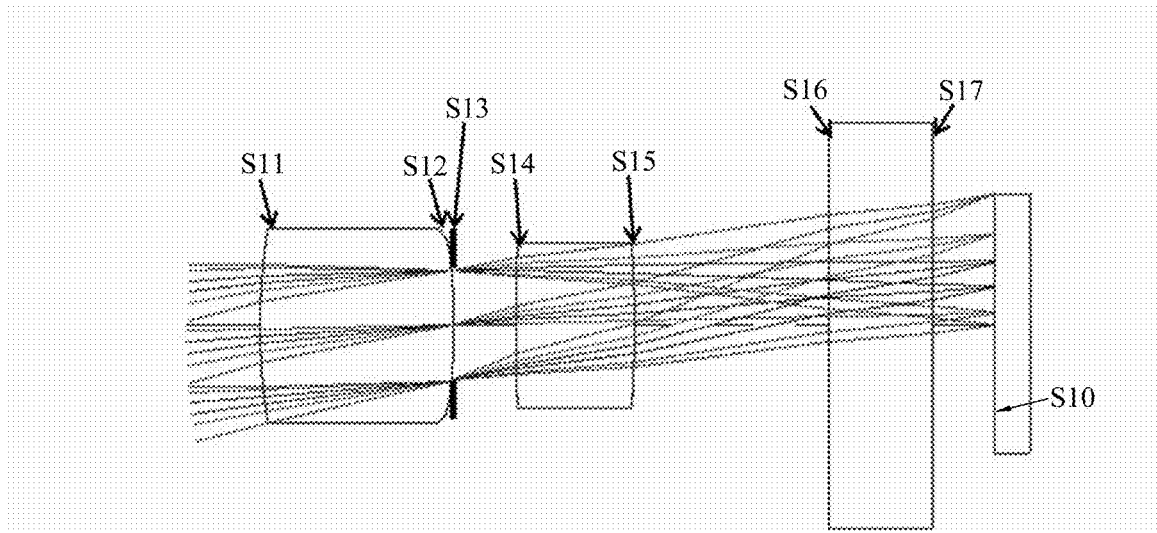
FIGS. 2A and 2B are schematic diagrams illustrating lens combinations of a composite array camera lens module with telephoto/wide-angle effects in accordance with an embodiment of the disclosure.
Figure 2B:
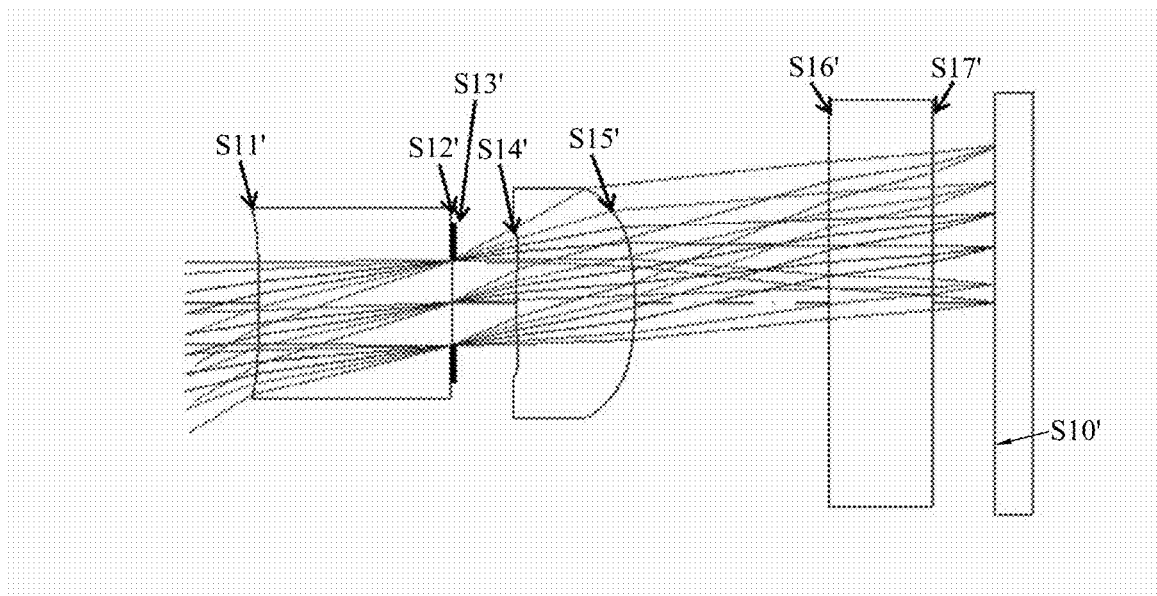

FIGS. 2A and 2B are schematic diagrams illustrating lens combinations of a composite array camera lens module with telephoto/wide-angle effects in accordance with an embodiment of the disclosure. The following paragraph is under the context of FIG. 1. The three-layer composite array camera lenses are optimized with three light sources having wavelengths of 486.1 nm, 587.6 nm and 656.3 nm. Two lenses with different effective focal lengths are described as follow.

FIG. 2A is a schematic diagram illustrating a lens combination of a three-layer composite array camera lens module with a telephoto effect in accordance with the disclosure. In conjunction with the FIG. 1, surfaces S11 to S17 constitute a three-layer telephoto lens (e.g., the first camera lens 200) with a field of view (FOV) of 30 degrees, a relative aperture f# (f-number) of 4.0, and an effective focal length f of 2.3627 mm. Surfaces S11 and S12 constitute a first layer of the three-layer telephoto lens, such as a first-type lens 111 of the first lens layer 11, which is a positive lens with an effective focal length f1 of 3.0755 mm S13 indicates the position of the diaphragm. Surfaces S14 and S15 constitute a second layer of the three-layer telephoto lens, such as a third-type lens 121 of the second lens layer 12, which is a positive lens with an effective focal length f2 of 6.9007 mm. Surfaces S16 and S17 constitute a third layer of the three-layer telephoto lens for filtering infrared (i.e., an infrared filter). In addition, a surface S10 represents an imaging face of the image sensor 13.

The structural parameters of the three-layer telephoto lens are shown in Table 1 below, for example, wherein FOV=30°; f-number=4.0; f=2.3627 mm

TABLE 1

Structural Parameters for Three-Layer Telephoto Lens

| Surface No. | Surface Type | Radius (mm) | Thickness (mm) | Refractive Index | Abbe number | Half Aperture (mm) |
|---|---|---|---|---|---|---|
| Object | Spherical | ∞ | ∞ | | | |
| S11 | Aspherical | 2.8197 | 0.9361 | 1.4925 | 59.37 | 0.4680 |
| S12 | Aspherical | −2.9142 | −0.0098 | | | 0.2661 |
| S13 | Spherical | ∞ | 0.3112 | | | 0.2654 |
| S14 | Aspherical | 41.6552 | 0.5748 | 1.4925 | 59.37 | 0.3295 |
| S15 | Aspherical | −3.6837 | 0.9397 | | | 0.3925 |
| S16 | Spherical | ∞ | 0.5000 | 1.5231 | 54.49 | 0.5400 |
| S17 | Spherical | ∞ | 0.3000 | | | 0.5910 |
| Image S10 | Spherical | ∞ | 0.0000 | | | 0.6400 |

Moreover, the various types of lenses in the three-layer telephoto lens can be designed according to an aspherical formula. In an embodiment, the aspherical coefficients of various types of lenses are listed in Table 2 below.

TABLE 2

Aspherical Coefficients for Three-Layer Telephoto Lens

| Surface No. | K | A4 | A6 | A8 | A10 |
|---|---|---|---|---|---|
| S11 | −6.3084 | −0.0465 | 0.3658 | −2.2675 | 4.7485 |
| S12 | −9.6766 | 0.1544 | −2.4859 | 39.8522 | −219.7646 |
| S14 | 10902.9874 | 0.3358 | 2.2129 | −23.5445 | 74.9136 |
| S15 | 35.6829 | 0.4285 | 0.2355 | 1.4150 | −5.6810 |

FIG. 2B is a schematic diagram illustrating a lens combination of a three-layer composite array camera lens module with a wide-angle effect in accordance with the disclosure. In conjunction with the FIG. 1, surfaces S11' to S17' constitute a three-layer wide-angle lens (e.g., the second camera lens 300), its field of view (FOV') is 60 degrees, its relative aperture f#' (f-number) is 4.5, and its effective focal length f' is 1.7926 mm. Surfaces S11' and S12' constitute a first layer of the three-layer wide-angle lens, such as a second-type lens 112 of the first lens layer 11, which is a negative lens with an effective focal length f1' of −19.0928 mm S13' indicates the position of the diaphragm. Surfaces S14' and S15' constitute a second layer of the three-layer wide-angle lens, such as a fourth-type lens 122 of the second lens layer 12, which is a positive lens with an effective focal length f2' of 1.7142 mm. Surfaces S16' and S17' constitute a third layer of the three-layer wide-angle lens for filtering infrared (i.e., an infrared filter). In addition, a surface S10' represents an imaging face of the image sensor 13.

The structural parameters of the three-layer wide-angle lens are shown in Table 3 below, for example, wherein FOV=60°; f-number=4.5; f=1.7926 mm

TABLE 3

Structural Parameters for Three-Layer Wide-Angle Lens

| Surface No. | Surface Type | Radius (mm) | Thickness (mm) | Refractive Index | Abbe number | Half Aperture (mm) |
|---|---|---|---|---|---|---|
| Object | Spherical | ∞ | ∞ | | | |
| S11' | Aspherical | −15.0484 | 0.9361 | 1.4925 | 59.37 | 0.4470 |
| S12' | Aspherical | 25.5805 | −0.0098 | | | 0.2080 |
| S13' | Spherical | ∞ | 0.3112 | | | 0.2050 |
| S14' | Aspherical | 1.4149 | 0.5748 | 1.4925 | 59.37 | 0.3625 |
| S15' | Aspherical | −1.8126 | 0.9397 | | | 0.5579 |
| S16' | Spherical | ∞ | 0.5000 | 1.5231 | 54.49 | 0.6927 |
| S17' | Spherical | ∞ | 0.3000 | | | 0.7301 |
| Image S10' | Spherical | ∞ | 0.0000 | | | 0.7644 |

Moreover, the various types of lenses in the three-layer wide-angle lens can be designed according to an aspherical formula. In an embodiment, the aspherical coefficients of various types of lenses are listed in Table 4 below.

TABLE 4

Aspherical Coefficients for Three-Layer Wide-Angle Lens

| Surface No. | K | A4 | A6 | A8 | A10 |
|---|---|---|---|---|---|
| S11' | 212.8619 | −0.4529 | −0.6121 | 2.4674 | −7.0575 |
| S12' | −1.6763e+020 | −2.3453 | 18.6533 | −427.6586 | 3780.9337 |
| S14' | −23.7037 | −1.0225 | −14.1551 | 120.7754 | −841.0758 |
| S15' | 8.2962 | −0.6297 | −1.9780 | 6.2980 | −17.3988 |

Based on the optimization results above, it can be seen that a composite array camera lens module made up of a telephoto lens and a wide-angle lens can be obtained using a wafer-level manufacturing process. The telephoto lens and the wide-angle lens have different fields of view, relative apertures and effective focal lengths. The field of view (FOV) of the telephoto lens is lower than the field of view (FOV') of the wide-angle lens, that is, FOV<FOV'. The relative aperture f# of the telephoto lens is lower than the relative aperture f#' of the wide-angle lens, that is, f#<f#'. The effective focal length f of the telephoto lens is higher than the effective focal length f' of the wide-angle lens, that is, f>f'. From the diaphragm as the baseline, a set of lenses towards the object space (e.g., S11 and S12 and S11' and S12') is defined as a first set of effective lenses. From the diaphragm as the baseline, a set of lenses towards the image space (e.g., S14 and S15 and S14' and S15') is defined as a second set of effective lenses. The first set of effective lenses of the telephoto lens is a positive lens (i.e., the effective focal length f1>0), and the second set of effective lenses of the telephoto lens is a positive lens (i.e., the effective focal length f2>0). Moreover, the first set of effective lenses of the wide-angle lens is a negative lens (i.e., the effective focal length f1'<0), and the second set of effective lenses of the wide-angle lens is a positive lens (i.e., the effective focal length f2'>0), and the absolute value of the effective focal length f1' of the first set of effective lenses of the wide-angle lens is greater than the absolute value of the effective focal length f2' of the second set of effective lenses of the wide-angle lens, that is, |f1'|>|f2'|.

Figure 3:
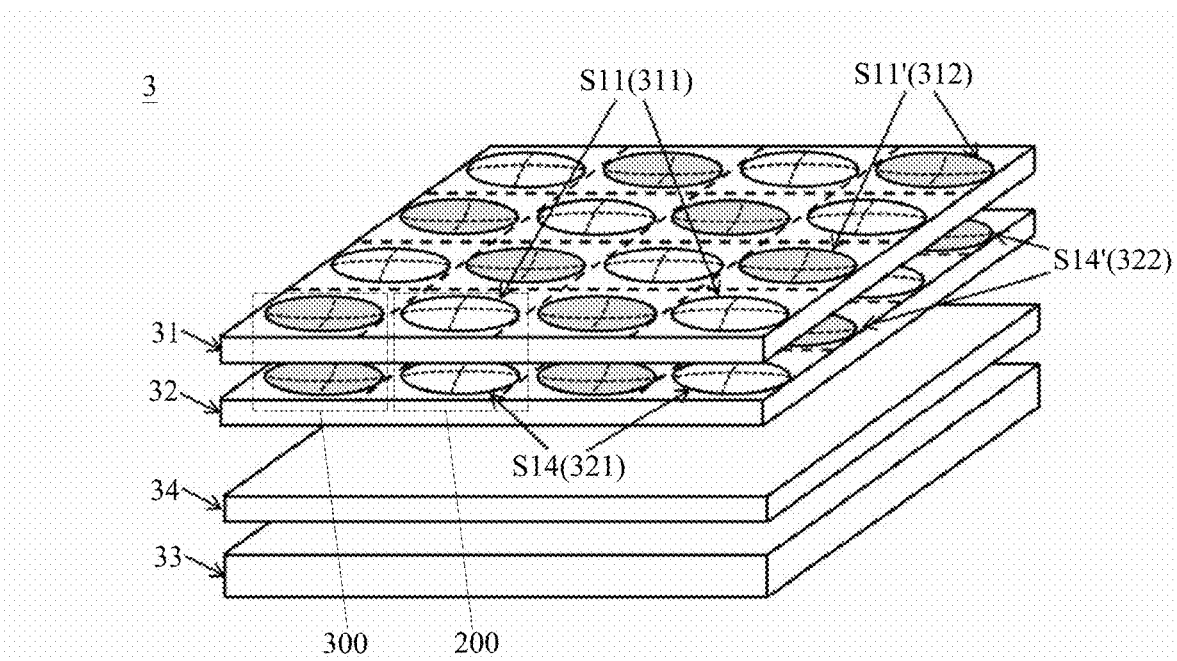
FIG. 3 is a schematic diagram illustrating the structure of a composite array camera lens module in accordance with an embodiment of the disclosure.

Referring to FIG. 3, a schematic diagram illustrating the structure of a composite array camera lens module in accordance with an embodiment of the disclosure is shown. Please refer to the following paragraphs in conjunction with FIGS. 2A and 2B. A three-layer 4×4 composite array camera lens is used as an example, which comprises a first lens layer 31, a second lens layer 32, an infrared filter 34 and an image sensor 33. Lens surfaces S11 and S11' of the first lens layer 31 close to the object space are provided with first-type lenses 311 and second-type lenses 312, respectively. Lens surfaces S14 and S14' of the second lens layer 32 close to the object space are provided with third-type lenses 321 and the fourth-type lenses 322, respectively. Through combinations of lenses in the first lens layer 31 and the second lens layer 32, for example, a telephoto lens is formed with a combination of a positive lens (the first-type lens 311) and a positive lens (the third-type lens 321), such as the first camera lens 200 shown; a wide-angle lens is formed with a combination of a negative lens (the second-type lens 312) and a positive lens (the fourth-type lens 322), such as the second camera lens 300 shown. In addition, the first lens layer 31 and the second lens layer 32 are both a lens array, so a plurality of telephoto lenses and a plurality of wide-angle lenses can be provided to form a composite array camera lens module 3. As a plurality of lenses can capture images at the same time, there is no need to adjust the focal length to capture images of objects, as is the case for a single lens. Thus, the disclosure allows fast and clear image capturing, which helps in determining the distance and the speed of an object.

Figure 4A:
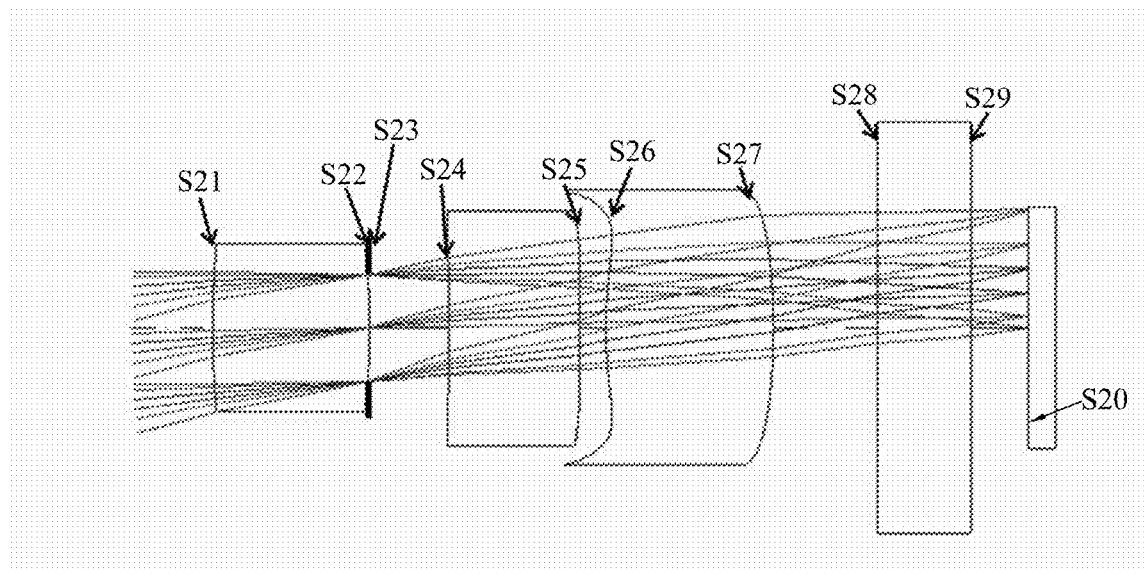
FIGS. 4A and 4B are schematic diagrams illustrating lens combinations of a composite array camera lens module with telephoto/wide-angle effects in accordance with another embodiment of the disclosure.
Figure 4B:
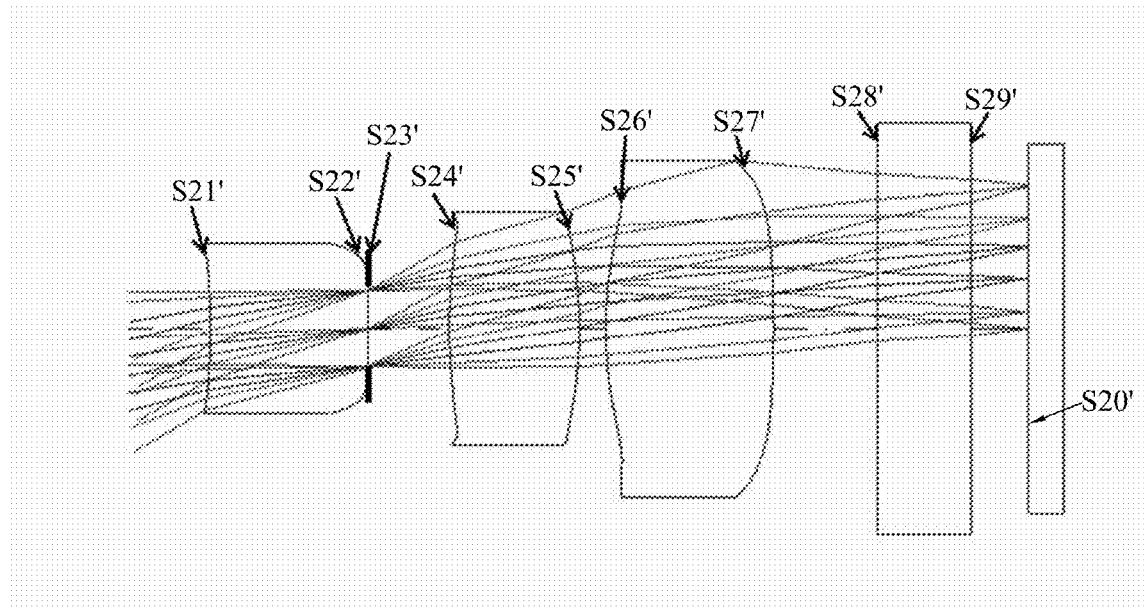
Figure 5:
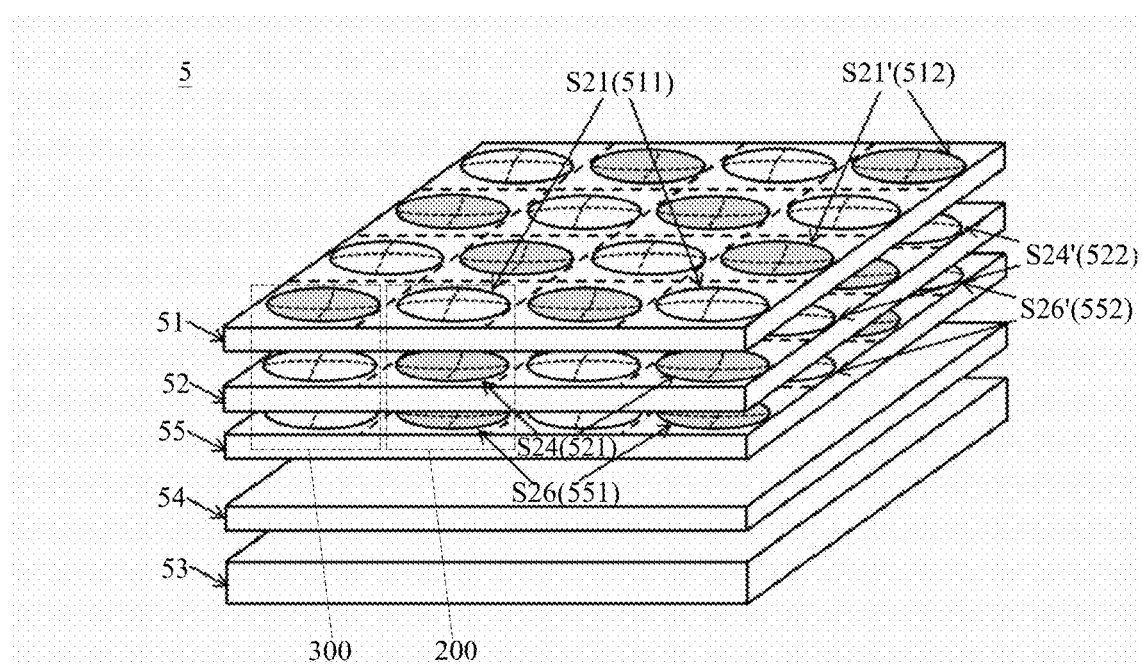
FIG. 5 is a schematic diagram illustrating the structure of a composite array camera lens module in accordance with another embodiment of the disclosure.

FIGS. 4A and 4B are schematic diagrams illustrating lens combinations of a composite array camera lens module with telephoto/wide-angle effects in accordance with another embodiment of the disclosure. FIG. 5 is a schematic diagram illustrating the structure of a composite array camera lens module in accordance with another embodiment of the disclosure. The following paragraph is also under the context of FIG. 1. The four-layer composite array camera lenses are optimized with three light sources having wavelengths of 486.1 nm, 587.6 nm and 656.3 nm. Two lenses with different effective focal lengths are described as follow.

As shown in FIG. 4A, a schematic diagram illustrating a lens combination of a four-layer composite array camera lens module with a telephoto effect in accordance with the disclosure. Surfaces S21 to S29 constitute a four-layer telephoto lens with a field of view (FOV) of 30 degrees, a relative aperture f# of 4.0, and an effective focal length f of 2.4255 mm. Surfaces S21 and S22 constitute a first layer of the four-layer telephoto lens, such as a first-type lens 511 of a first lens layer 51. The first layer is a positive lens with an effective focal length f1 of 3.8188 mm. S23 indicates the position of the diaphragm. Surfaces S24 and S25 constitute a second layer of the four-layer telephoto lens, such as a third-type lens 521 of a second lens layer 52. Surfaces S26 and S27 constitute a third layer of the four-layer telephoto lens, such as a fifth-type lens 551 of a third lens layer 55. Surfaces S24 to S27 can be defined as a second set of effective lens, which is effectively a positive lens with an effective focal length f2 of 3.7072 mm. Surfaces S28 and S29 constitute a fourth layer of the fourth-layer telephoto lens for filtering infrared (i.e., an infrared filter). In addition, a surface S20 represents an imaging face of an image sensor 53.

The structural parameters of the four-layer telephoto lens are shown in Table 5 below, for example, wherein FOV=30°; f-number=4.0; f=2.4255 mm

TABLE 5

Structural Parameters for Four-Layer Telephoto Lens

| Surface No. | Surface Type | Radius (mm) | Thickness (mm) | Refractive Index | Abbe number | Half Aperture (mm) |
|---|---|---|---|---|---|---|
| Object | Spherical | ∞ | ∞ | | | |
| S21 | Aspherical | 4.1403 | 0.8385 | 1.4925 | 59.37 | 0.4508 |
| S22 | Aspherical | −3.2158 | −0.0121 | | | 0.2856 |
| S23 | Spherical | ∞ | 0.4348 | | | 0.2853 |
| S24 | Aspherical | −7.6699 | 0.6954 | 1.4925 | 59.37 | 0.3730 |
| S25 | Aspherical | −199.6595 | 0.1422 | | | 0.4695 |
| S26 | Aspherical | 2.5174 | 0.8954 | 1.4925 | 59.37 | 0.5000 |
| S27 | Aspherical | −3.6638 | 0.5529 | | | 0.6074 |
| S28 | Spherical | ∞ | 0.5000 | 1.5231 | 54.49 | 0.6210 |
| S29 | Spherical | ∞ | 0.3000 | | | 0.6270 |
| Image S20 | Spherical | ∞ | 0.0000 | | | 0.6340 |

Moreover, the various types of lenses in the four-layer telephoto lens can be designed according to an aspherical formula. In an embodiment, the aspherical coefficients of various types of lenses are listed in Table 6 below.

TABLE 6

Aspherical Coefficients for Four-Layer Telephoto Lens

| Surface No. | K | A4 | A6 | A8 | A10 |
|---|---|---|---|---|---|
| S21 | −6.5071 | −0.0175 | −0.4985 | 2.4860 | −4.5105 |
| S22 | −1.7950 | 0.0807 | −1.3741 | −0.3462 | 61.7704 |
| S24 | −161.9209 | 0.0395 | 0.3472 | 3.5741 | −22.5653 |
| S25 | −4335.8630 | 0.0573 | 0.1177 | −5.1343 | 9.2060 |
| S26 | 0.4362 | 0.0004 | −1.0810 | 0.8971 | −5.2844 |
| S27 | 4.7258 | −0.0004 | −0.1313 | −0.4832 | −0.0291 |

FIG. 4B is a schematic diagram illustrating a lens combination of a four-layer composite array camera lens module with a wide-angle effect in accordance with the disclosure. Surfaces S21' to S29' constitute a four-layer wide-angle lens with a field of view (FOV') of 60 degrees, a relative aperture f#' of 4.5, and an effective focal length f' of 1.7184 mm. Surfaces S21' and S22' constitute a first layer of the four-layer wide-angle lens, such as a second-type lens 512 of the first lens layer 51. The first layer is a negative lens with an effective focal length f1' of −12.5370 mm S23' indicates the position of the diaphragm. Surfaces S24' and S25' constitute a second layer of the four-layer wide-angle lens, such as a fourth-type lens 522 of the second lens layer 52. Surfaces S26' and S27' constitute a third layer of the four-layer wide-angle lens, such as a sixth-type lens 552 of the third lens layer 55. Surfaces S24' to S27' are defined as a second set of effective lens, which is effectively a positive lens with an effective focal length f2' of 1.7110 mm. Surfaces S28' and S29' constitute a fourth layer of the four-layer wide-angle lens for filtering infrared (i.e., an infrared filter). In addition, a surface S20' represents an imaging face of the image sensor 53.

The structural parameters of the four-layer wide-angle lens are shown in Table 7 below, for example, wherein FOV=60°; f-number=4.5; f=1.7184 mm.

TABLE 7

Structural Parameters for Four-Layer Wide-Angle Lens

| Surface No. | Surface Type | Radius (mm) | Thickness (mm) | Refractive Index | Abbe number | Half Aperture (mm) |
|---|---|---|---|---|---|---|
| Object | Spherical | ∞ | ∞ | | | |
| S21' | Aspherical | −4.7846 | 0.8385 | 1.4925 | 59.37 | 0.4400 |
| S22' | Aspherical | −22.4857 | 0.0000 | | | 0.2040 |
| S23' | Spherical | ∞ | 0.4348 | | | 0.2030 |
| S24' | Aspherical | 2.6426 | 0.6954 | 1.4925 | 59.37 | 0.4598 |
| S25' | Aspherical | −2.5508 | 0.1422 | | | 0.6260 |
| S26' | Aspherical | 2.2860 | 0.8954 | 1.4925 | 59.37 | 0.7346 |
| S27' | Aspherical | −7.2568 | 0.5529 | | | 0.8964 |
| S28' | Spherical | ∞ | 0.5000 | 1.5231 | 54.49 | 0.8248 |
| S29' | Spherical | ∞ | 0.3000 | | | 0.7937 |
| Image S20' | Spherical | ∞ | 0.0000 | | | 0.7653 |

Moreover, the various types of lenses in the four-layer wide-angle lens can be designed according to an aspherical formula. In an embodiment, the aspherical coefficients of various types of lenses are listed in Table 8 below.

TABLE 8

Aspherical Coefficients for Four-Layer Wide-Angle Lens

| Surface No. | K | A4 | A6 | A8 | A10 |
|---|---|---|---|---|---|
| S21' | 14.5172 | −0.0610 | −1.2788 | 3.3383 | −4.0682 |
| S22' | −9.5509e+017 | −0.6276 | 5.5027 | −27.8353 | −490.2553 |
| S24' | −22.8665 | −0.0967 | −1.6771 | 15.7593 | −32.8179 |
| S25' | 5.4456 | −0.0454 | 0.3381 | −0.5067 | 1.2641 |
| S26' | 1.4294 | 0.0022 | −0.1298 | −0.0517 | −0.3902 |
| S27' | 27.4602 | −0.0083 | −0.2269 | −0.0745 | 0.0501 |

Based on the optimization results above, it can be seen that a composite array camera lens module made up of a telephoto lens and a wide-angle lens can be obtained using a wafer-level manufacturing process. The telephoto lens and the wide-angle lens have different fields of view, relative apertures and effective focal lengths. The field of view (FOV) of the telephoto lens is lower than the field of view (FOV') of the wide-angle lens, that is, FOV<FOV'. The relative aperture f# of the telephoto lens is lower than the relative aperture f#' of the wide-angle lens, that is, f#<f#'. The effective focal length f of the telephoto lens is higher than the effective focal length f' of the wide-angle lens, that is, f>f'. From the diaphragm as the baseline, a set of lenses (e.g., S21 and S22 and S21' and S22') towards the object space is defined as a first set of effective lens. From the diaphragm as the baseline, a set of lenses towards the image space (e.g., S24 to S27 and S24' to S27') is defined as the second set of effective lens. The first set of effective lenses of the telephoto lens is a positive lens (i.e., the effective focal length f1>0), and the second set of effective lenses of the telephoto lens is a positive lens (i.e., the effective focal length f2>0). Moreover, the first set of effective lenses of the wide-angle lens is a negative lens (i.e., the effective focal length f1'<0), and the second set of effective lenses of the wide-angle lens is a positive lens (i.e., the effective focal length f2'>0), and the absolute value of the effective focal length f1' of the first set of effective lenses of the wide-angle lens is greater than the absolute value of the effective focal length f2' of the second set of effective lens of the wide-angle lens, that is, |f1'|>|f2'|.

In an embodiment, as shown in FIG. 5, a four-layer 4×4 composite array camera lens is used as an example, which comprises a first lens layer 51, a second lens layer 52, a third lens layer 55, an infrared filter 54 and an image sensor 53. Lens surfaces S1 and S21' of the first lens layer 51 close to the object space are provided with first-type lenses 511 and second-type lenses 512, respectively. Lens surfaces S24 and S24' of the second lens layer 52 close to the object space are provided with third-type lenses 521 and fourth-type lenses 522, respectively. Lens surfaces S26 and S26' of the third lens layer 55 close to the object space are provided with fifth-type lenses 551 and the sixth-type lenses 552, respectively. The second lens layer 52 and the third lens layer 55 are located at some positions towards the image space from the diaphragm, such that they can be considered as a set of lenses. Through combinations of the lenses in the first lens layer 51, the second lens layer 52 and the third lens layer 55, for example, a telephoto lens is formed with a combination of a positive lens (the first-type lens 511) and an effectively positive lens (which is the result of a combination of the third-type lens 521 and the fifth-type lens 551), such as the first camera lens 200 shown; a wide-angle lens is formed with a combination of a negative lens (the second-type lens 512) and an effectively positive lens (which is the result of a combination of the fourth-type lens 522 and the sixth-type lens 552), such as the second camera lens 300 shown. In addition, the first lens layer 51, the second lens layer 52 and the third lens layer 55 are all lens arrays, so a plurality of telephoto lenses and a plurality of wide-angle lenses can be provided to form a composite array camera lens module 5.

From the above, it can be seen that in addition to the two-layer lens module shown with respect to FIG. 1, the disclosure may be further applied to implementations with three layers of lenses. When a first-type lens of the first lens layer is a positive lens and a third-type lens and a fifth-type lens of the second and third lens layers, respectively, form an effectively positive lens, the first camera lens in the three-layer lens module may form a telephoto lens. Furthermore, when a second-type lens of the first lens layer is a negative lens and a fourth-type lens and a sixth-type lens of the second and third lens layers, respectively, form an effectively positive lens, the second camera lens in the three-layer lens module may form a wide-angle lens.

In other words, the second lens layer can be designed to comprise a plurality of second sub-lens layers. With the set of lenses made up of various types of lenses in the plurality of second sub-lens layers effectively forming a positive lens, the addition of a positive lens or a negative lens in the first lens layer would result in a telephoto lens or a wide-angle lens, respectively. Similarly, the first lens layer for two-layer lens module can be designed to comprise a plurality of first sub-lens layers. With the set of lenses made up of various types of lenses in the plurality of first sub-lens layers effectively forming a positive or a negative lens, the addition of a positive lens in the second lens layer would result in a telephoto lens or a wide-angle lens, respectively.

In summary, the first lens layer and the second lens layer can both be formed from a number of different types of lenses, which allows positive lenses or negative lenses with effective focal lengths to be created. A telephoto lens or a wide-angle lens can then be formed by choosing a positive-positive lens combination or a negative-positive combination.

Figure 6:
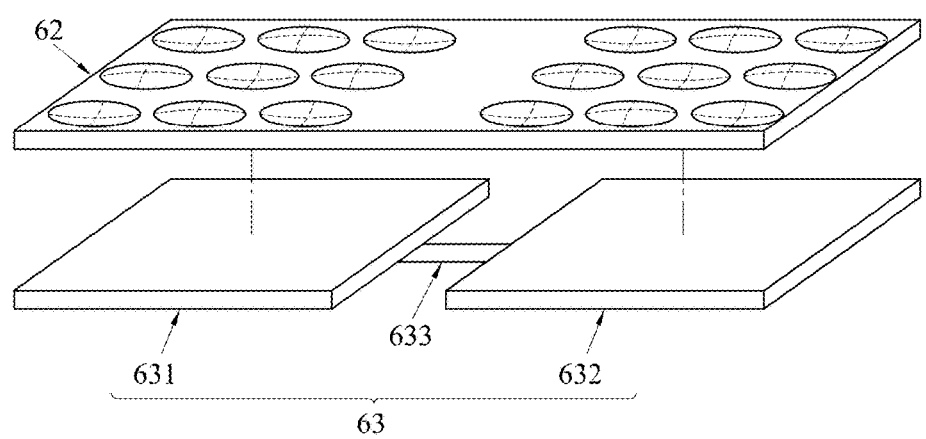
FIG. 6 is a schematic diagram illustrating a composite array camera lens module having a plurality of image sensors in accordance with the disclosure.

Referring to FIG. 6, a schematic diagram illustrating a composite array camera lens module having a plurality of image sensors in accordance with the disclosure is shown. Image sensors with a size of 6 mm×4 mm are generally expensive. If the size of the image sensor is increased, the image sensor can become difficult to be manufactured and very expensive. On the other hand, lens layers are generally manufactured by injection molding, which is a low cost process. Thus, it is a more economical and practical approach to increase the sizes of the lens layers, while keeping the image sensors the same size but using more of them.

As shown in FIG. 6, there are two image sensors 63, i.e., a first sensor 631 and a second sensor 632. These two sensors can be connected in series by a wire 633, and receive optical signals from a second lens layer 62 (a first lens layer is omitted herein). Although the second lens layer 62 is implemented as only a single layer, the two lens arrays thereon are spaced apart. A sensor is correspondingly provided below each of the two lens arrays. No sensor is provided at places where there is no lens array.

The advantage of this implementation is that two spaced-apart lens arrays can be provided in a single lens layer with corresponding sensors 631 and 632. If two image capturing locations are too close to each other, it becomes more difficult to determine the distance of an object. In an embodiment, the two lens arrays (thus the image capturing locations) are spaced apart, which helps in determining the distance of an object. For example, as the distance between two adjacent wide-angle lens capturing locations is greater, the images used in determining the distance of an object are more accurate.

In the wafer-level composite array camera lens proposed by the disclosure, the same layer uses the same material, different layers may use different materials, and the lens layers and the image sensor(s) are designed to be flat plane with a constant interval between any two of the planes. In an embodiment, the reciprocal of the effective focal length of each lens is not equal to zero, i.e., the effective focal length is not infinity. The interval between an image sensor having an identical height and a lens layer in front thereof is constant. At least one side of the camera lens array has at least two lenses, e.g., 1×2, 1×3, 1×4, 2×2, 2×3, 2×4, 3×3, 3×4, or 4×4 etc. Lens optimization can be applied to a single wavelength or multiple wavelengths. The lens optimization can be applied to UV light, visible light or infrared light.

It can be concluded from the above that the disclosure provides a composite array camera lens module using a wafer-level lens manufacturing process, wherein lenses on the same layer are first formed, so that array lenses in the same layer comprise lens types with two or more different radii of curvatures, and then different layers of lens array and the image sensor are assembled in a single alignment and simple calibration process to form the composite array camera lens module. The composite array camera lens module now has lenses with two or more focal lengths and two or more fields of view, thereby achieving wide-angle and telephoto image capturing and facilitating full speed range object detection.

The above embodiments are only used to illustrate the principles of the disclosure, and should not be construed as to limit the disclosure in any way. The above embodiments can be modified by those with ordinary skill in the art without departing from the scope of the disclosure as defined in the following appended claims.

What is claimed is:

1. A composite array camera lens module, comprising:
   a first lens layer disposed at a position from a diaphragm towards an object space and comprising a first-type lens and a second-type lens;
   a second lens layer disposed at a position from the diaphragm towards an image space and comprising a third-type lens and a fourth-type lens, wherein the first-type lens and the third-type lens are positive lenses and form a first camera lens with a first effective focal length, and the second-type lens and the fourth-type lens are a negative lens and a positive lens, respectively, and form a second camera lens with a second effective focal length less than the first effective focal length; and
   an image sensor arranged at a side of the second lens layer away from the diaphragm, wherein the first lens layer, the second lens layer and image sensor are designed to be flat planes and an interval between any two of the planes is constant, and wherein a reciprocal of an effective focal length of any of the lenses of the first and second lens layers is not zero.

2. The composite array camera lens module of claim 1, further comprising an infrared filter disposed between the second lens layer and the image sensor.

3. The composite array camera lens module of claim 1, wherein the diaphragm is formed on a surface of the first lens layer towards the second lens layer.

4. The composite array camera lens module of claim 1, wherein the first camera lens has a first field of view, the second camera lens has a second field of view, and the first field of view is lower than the second field of view.

5. The composite array camera lens module of claim 1, wherein the first camera lens has a first relative aperture, the second camera lens has a second relative aperture, and the first relative aperture is lower than the second relative aperture.

6. The composite array camera lens module of claim 1, wherein in the second camera lens, an absolute value of an effective focal length of the second-type lens is greater than an absolute value of an effective focal length of the fourth-type lens.

7. The composite array camera lens module of claim 1, wherein the first-type lens and the second-type lens form an array combination, and the third-type lens and the fourth-type lens form an array combination.

8. The composite array camera lens module of claim 1, further comprising a third lens layer disposed between the second lens layer and the image sensor and comprising a fifth-type lens and a sixth-type lens, wherein the fifth-type lens and the third-type lens effectively form a positive lens, so that the first, the third and the fifth-type lenses form the first camera lens, and the sixth-type lens and the fourth-type lens effectively form a positive lens, so that the second, the fourth and the sixth-type lenses form the second camera lens.

9. The composite array camera lens module of claim 1, wherein the first lens layer comprises a plurality of first sub-lens layers, and a set of lenses comprising different types of lenses in the plurality of first sub-lens layers effectively forms a positive lens or a negative lens.

10. The composite array camera lens module of claim 1, wherein the second lens layer comprises a plurality of second sub-lens layers, and a set of lenses comprising different types of lenses in the plurality of second sub-lens layers effectively forms a positive lens.

* * * * *